US008236157B2

(12) United States Patent
Gebregiorgis

(10) Patent No.: US 8,236,157 B2
(45) Date of Patent: Aug. 7, 2012

(54) ORGANIC SOLVENT FREE PIGMENT DISPERSANT FOR WATERBORNE ELECTROCOATING

(75) Inventor: Taddesse Gebregiorgis, Rochester, MI (US)

(73) Assignee: E I du Pont de Nemours and Company, Wilmington, DE (US)

( * ) Notice: Subject to any disclaimer, the term of this patent is extended or adjusted under 35 U.S.C. 154(b) by 314 days.

(21) Appl. No.: 12/744,196

(22) PCT Filed: Dec. 12, 2008

(86) PCT No.: PCT/US2008/086635
§ 371 (c)(1),
(2), (4) Date: May 21, 2010

(87) PCT Pub. No.: WO2009/079387
PCT Pub. Date: Jun. 25, 2009

(65) Prior Publication Data
US 2010/0264034 A1    Oct. 21, 2010

Related U.S. Application Data

(60) Provisional application No. 61/007,691, filed on Dec. 14, 2007.

(51) Int. Cl.
*C09D 5/24* (2006.01)
*C09D 5/44* (2006.01)
*C09D 5/00* (2006.01)
*C25D 13/00* (2006.01)
*C25D 13/06* (2006.01)
*C25D 9/02* (2006.01)

(52) U.S. Cl. ........ 204/501; 204/502; 204/503; 204/506; 204/507; 204/509; 204/499; 204/500; 204/471; 204/487; 204/489; 524/901; 525/525; 525/526; 525/530; 525/532; 528/44; 528/45; 523/400; 523/402; 523/414; 523/415

(58) Field of Classification Search .................. 204/471, 204/480, 487, 488, 489, 499, 500, 501, 502, 204/503, 506, 507, 509; 523/400, 402, 414, 523/415; 524/901; 525/525, 526, 530, 532; 528/44, 45
See application file for complete search history.

(56) References Cited

U.S. PATENT DOCUMENTS

| 4,230,552 | A | * | 10/1980 | Schimmel et al. | ............ 204/502 |
| 4,419,467 | A |   | 12/1983 | Wismer et al. | |
| 4,564,632 | A |   | 1/1986 | Nonn et al. | |
| 4,596,842 | A | * | 6/1986 | Chung et al. | .................. 523/414 |
| 4,605,690 | A | * | 8/1986 | Debroy et al. | ................. 523/414 |
| 4,612,338 | A | * | 9/1986 | Chung et al. | .................. 523/414 |
| 4,900,415 | A | * | 2/1990 | Chung et al. | .................. 204/503 |
| 4,976,833 | A | * | 12/1990 | Debroy et al. | ................. 204/503 |
| 5,035,785 | A | * | 7/1991 | Debroy et al. | ................. 204/503 |
| 5,049,249 | A | * | 9/1991 | Chung et al. | .................. 204/503 |
| 5,128,393 | A | * | 7/1992 | Peng et al. | ...................... 523/402 |
| 5,145,568 | A | * | 9/1992 | Chung et al. | .................... 524/86 |
| 6,123,822 | A | * | 9/2000 | Chung et al. | .................. 204/489 |
| 6,689,459 | B1 | * | 2/2004 | Chung et al. | ............ 428/355 EP |

FOREIGN PATENT DOCUMENTS

| EP | 0252426 | 1/1988 |
| EP | 0656384 | 6/1995 |

* cited by examiner

*Primary Examiner* — Bruce Bell
(74) *Attorney, Agent, or Firm* — Brian J Myers

(57) ABSTRACT

A pigment dispersing resin is disclosed along with pigment dispersion, electrodepositable coating compositions using the pigment dispersing resin, and methods for applying the electrodepositable coating composition. The pigment dispersing resin consists essentially of the carboxylic acid salt of an aminated bisphenol epoxy resin and an alkoxylated styrenated phenol. Pigment dispersions made from the dispersing resin are especially useful for forming low or no volatile organic content electrocoating baths.

17 Claims, No Drawings

ORGANIC SOLVENT FREE PIGMENT DISPERSANT FOR WATERBORNE ELECTROCOATING

CROSS-REFERENCE TO RELATED APPLICATION

This application claims priority from U.S. Provisional Application Ser. No. 61/007,691 (filed Dec. 14, 2007), the disclosure of which is incorporated by reference herein for all purposes as if fully set forth.

FIELD OF THE DISCLOSURE

This disclosure relates to carboxylic acid salts of aminated bisphenol epoxy resins and alkoxylated styrenated phenols and their use as pigment dispersing resins having low or no volatile organic solvent content (VOC), especially for cathodic electrocoating compositions. Also disclosed herein are pigment dispersions and electrodepositable coating compositions containing the pigment dispersing resins.

DESCRIPTION OF THE RELATED ART

The coating of electrically conductive substrates by electrodeposition is a well-known and important industrial process that typically has low VOC. In this process, a conductive article is immersed as one electrode in an electrocoat bath made from an aqueous emulsion of film-forming polymer. The electrocoat bath comprises film-forming polymer, sometimes called the principal emulsion, pigment paste, water, and optionally other ingredients. An electric current is passed between the article and the counter electrode in electrical contact with the aqueous emulsion until the desired coating is produced on the article. The thickness of the applied coating is a function of the bath characteristics, the immersion time, applied voltage, and so forth.

The pigment dispersant and pigment dispersion are very important parts of the electrocoat bath. The pigment dispersion process involves the separation of the primary pigment particles from their agglomerates or aggregates, the displacement of occluded air and absorbed water and the wetting and coating of pigment surfaces with the dispersing resin. Ideally, each pigment particle, having been mechanically separated during dispersion, is also stabilized by the dispersing resin against flocculation. If the pigment particles are not properly stabilized, the pigment may settle out of the electrocoat bath which can result in loss of corrosion protection to the coated substrate. In addition, the surface characteristics of the applied coating and the electrocoat bath operating conditions may be adversely affected by inadequate pigment dispersion.

Many pigment dispersants are a mixture of resin and volatile organic solvents. Current commercial pigments dispersants contain 30 to 40 percent organic solvent. The organic solvent is one of the main contributors to the volatile organic content (VOC) of the electrocoat bath. Increasingly strict environmental regulations are calling for the lowering of the VOC in all coating compositions. It is an object of this disclosure to provide a low to zero VOC pigment dispersant resin for electrocoat baths that still maintains all of the necessary characteristics for use in an electrocoat bath.

SUMMARY OF THE DISCLOSURE

In one aspect, the present disclosure relates to a pigment dispersant consisting essentially of:
A) an aminated epoxy resin of formula (I)

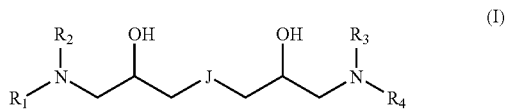

wherein J is the residue of a bisphenol epoxy resin and each of $R_1$, $R_2$, $R_3$ and $R_4$ are independently selected from the group consisting of H, C1 to C4 alkyl, C1 to C6 hydroxy alkyl, carbocycle or heterocycle containing moiety and optionally, $R_1$ and $R_2$ or $R_3$ and $R_4$ can be taken together to form a cyclic structure and wherein the amine groups are 80 percent to 100 percent neutralized with a carboxylic acid;
B) an alkoxylated styrenated phenol; and
C) water
wherein the pigment dispersant is essentially free from volatile organic solvents.

In another aspect, the present disclosure relates to a pigment dispersing resin consisting essentially of;
A) an aminated epoxy resin of formula (I)

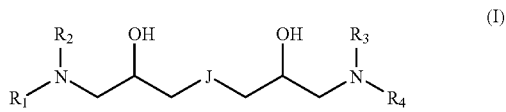

wherein J is the residue of a bisphenol epoxy resin and each of $R_1$, $R_2$, $R_3$ and $R_4$ are independently selected from the group consisting of H, C1 to C4 alkyl, C1 to C6 hydroxy alkyl, carbocycle or heterocycle containing moiety and optionally, $R_1$ and $R_2$ or $R_3$ and $R_4$ can be taken together to form a cyclic structure and wherein the amine groups are 80 percent to 100 percent neutralized with a carboxylic acid;
B) an alkoxylated styrenated phenol; and
wherein the pigment dispersing resin is essentially free from volatile organic solvents.

In a third aspect, the present disclosure relates to cathodic electrocoating composition comprising an electrodepositable binder composition, a pigment dispersant and pigment; wherein the pigment dispersant consisting essentially of:
A) an aminated epoxy resin of formula (I)

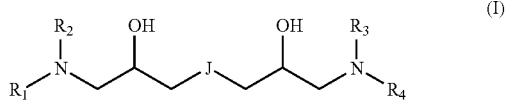

wherein J is the residue of a bisphenol epoxy resin and each of $R_1$, $R_2$, $R_3$ and $R_4$ are independently selected from the group consisting of H, C1 to C4 alkyl, C1 to C6 hydroxy alkyl, carbocycle or heterocycle containing moiety and optionally, $R_1$ and $R_2$ or $R_3$ and $R_4$ can be taken together to form a cyclic structure and wherein the amine groups are 80 percent to 100 percent neutralized with a carboxylic acid;

B) an alkoxylated styrenated phenol; and
C) water; and
wherein the pigment dispersant is essentially free from volatile organic solvents.

Also disclosed herein, is a method for forming a coating on a substrate using the cathodic electrocoating composition.

DETAILED DESCRIPTION OF THE DISCLOSURE

The features and advantages of the present disclosure will be more readily understood by those of ordinary skill in the art from reading the following detailed description. It is to be appreciated that certain features of the disclosure, which are, for clarity, described in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

As used herein, the term "essentially free from" means the substantial absence of volatile organic solvents, wherein the intent is to minimize the presence and/or the effect of said solvents. Quantitatively, for the purposes of the present application, this shall mean that a mixture or composition comprises no more than 5 percent by weight of volatile organic solvents, but less than 5 wt % is preferable.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

In one embodiment, the present disclosure relates to a pigment dispersing resin composition. The pigment dispersing resin consists essentially of two components: A) the carboxylic acid salt of an aminated bisphenol epoxy resin; and, B) an alkoxylated styrenated phenol.

The pigment dispersing resin comprises in the range of from 40 percent to 90 percent by weight of the carboxylic acid salt of an aminated bisphenol epoxy resin and in the range of from 10 percent to 60 percent by weight of an alkoxylated styrenated phenol. Preferably, the pigment dispersing resin comprises in the range of from 50 percent to 85 percent by weight of the carboxylic acid salt of an aminated bisphenol epoxy resin and in the range of from 15 percent to 50 percent by weight of an alkoxylated styrenated phenol. Most preferably, the pigment dispersing resin comprises in the range of from 55 percent to 80 percent by weight of the carboxylic acid salt of an aminated bisphenol epoxy resin and in the range of from 20 percent to 45 percent by weight of an alkoxylated styrenated phenol. All percentages by weight are based on 100 percent of the total weight of carboxylic acid salt of an aminated bisphenol epoxy resin and the alkoxylated styrenated phenol.

Component A of the pigment dispersant, in its free amine form (i.e., prior to forming the carboxylic acid salt), has a structure according to formula (I)

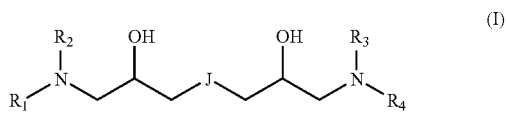

wherein J is the residue of a bisphenol epoxy resin and each of $R_1$, $R_2$, $R_3$ and $R_4$ are independently selected from the group consisting of: H; C1 to C4 alkyl; C1 to C6 hydroxy alkyl; carbocycle or heterocycle containing moiety and wherein $R_1$ and $R_2$ or $R_3$ and $R_4$ optionally can be taken together to form a cyclic structure. The amine groups of component A of the present disclosure are 80 to 100 percent neutralized with carboxylic acid.

In one embodiment, J has the structure according to formula (II);

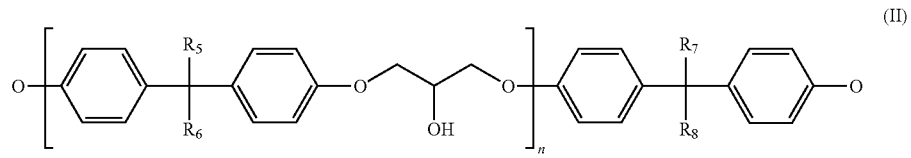

wherein each of $R_5$, $R_6$, $R_7$ and $R_8$ are independently selected from the group consisting of H and C1 to C4 alkyl, and n is an integer from 0 to 5.

Any of the known bisphenol epoxy resins can be used. As used herein, "bisphenol epoxy resin" is a term used to mean a polyepoxide ether of a phenolic compound. Preferably the bisphenol epoxy resin is the diglycidyl ether of bisphenol A. Other useful bisphenol epoxy resins include, for example, the diglycidyl ether of 4,4'-dihydroxybiphenyl, the diglycidyl ether of 1,5-dihydroxy naphthalene, the diglycidyl ether of 1,1-bis(4-hydroxyphenyl)ethane, the diglycidyl ether of bis(4-hydroxyphenyl)methane and the diglycidyl ether of 4,4'-dihydroxybenzophenone.

The bisphenol epoxy resin can be produced in several ways. Bisphenol can be reacted with epichlorohydrin in the presence of caustic to form bisphenol diglycidyl ether. By controlling the stoichiometric ratio of the bisphenol and epichlorohydrin, the product produced can be 100% diglycidyl ether or can be higher molecular weight condensation products of bisphenol diglycidyl ether and bisphenol. A wide range of epoxy equivalent weights can be used. In a preferred embodiment suitable for electrocoat compositions, the stoichiometry is controlled in such a way that the product formed is a diglycidyl ether having an epoxy equivalent weight in the range of from greater than 300 to less than 500. Preferably, the epoxy equivalent weight is in the range of from 350 to 475 and most preferably, the epoxy equivalent weight is in the range of from 375 to 450. Pigment dispersing resins produced from bisphenol epoxy resins having epoxy equivalent weights below 300 or above 500 are less preferred for electrocoat processes because they do not readily disperse pigments typically used in electrocoat compositions.

Another method for producing the desired bisphenol epoxy resin is, for example, reacting the diglycidyl ether of bisphenol A with bisphenol A in the presence of caustic. The diglycidyl ether of bisphenol A is commercially available as EPON® 828 epoxy resin from Hexion Specialty Chemicals, Houston, Tex.

The compound of formula (I) can be produced by reacting an amine functional compound with a bisphenol epoxy resin. It is preferred that all of the epoxy groups are reacted with the amine functional compounds. Suitable amine functional compounds include, in one embodiment, ammonia, N-methyl amine, N,N-dimethyl amine, N-monomethanol amine, N,N-diethanol amine, morpholine, piperidine, imidazole, pyrazole, oxazolidine, cyclic alkylene urea amine or a combination thereof. In another embodiment, the amine functional compound is N,N-dialkanol amine, and preferably, the N,N-dialkanol amine is N,N-diethanol amine. Examples of amines containing a carbocyclic or heterocyclic moiety can be, for example, aminomethyl cycloxexane, aminomethyl furan or an amine of the structure;

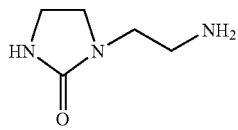

Suitable carboxylic acids for neutralizing the amines of formula (I) include, for example, C2 to C6 alkyl carboxylic acids, acetic acid, formic acid. Preferably, the carboxylic acid is a hydroxy functional alkyl carboxylic acid and more preferably, the carboxylic acid is lactic acid. The lactic acid can be in one of its pure enantiomeric forms, i.e., d-lactic acid or l-lactic acid; it can be a racemic mixture; or one of the d- or l-forms can be present in a higher percentage. Other hydroxy functional alkyl carboxylic acids that are suitable include, for example, 2-hydroxybutyric acid, 3-hydroxybutyric acid, alpha-hydroxy isovaleric acid, trimethylol propionic acid or a combination thereof.

Component B of the pigment dispersant is an alkoxylated styrenated phenol, for example, of formula (III).

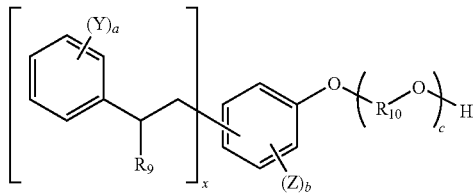

wherein Y is C1 to C4 alkyl; $R_9$ is H or $CH_3$; Z is C1 to C4 alkyl or an aromatic group; $R_{10}$ is C1 to C4 alkyl; x denotes an average of 1 to 3; a is 0 to 2; b is 0 to 2 and c is 1 to 30. $R_{10}$ can be, for example, $-CH_2CH_2-$, $-CH_2CH(CH_3)-$, $-(CH_2)_3-$, $-(CH_2)_4-$ or a combination thereof.

The alkoxylated styrenated phenols can be produced for example, by the reaction of 1 to 3 moles styrene with 1 mole of phenol. The product is then alkoxylated. The styrene is preferably a compound of the formula (IV);

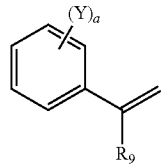

wherein Y, $R_9$ and a are defined as above. Examples of formula (IV) include styrene, vinyl toluene and alpha-methyl styrene. Preferred phenols are compounds of formula (V);

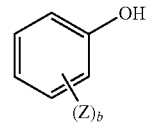

wherein Z and b are defined as above. Examples of formula (II) include phenol, the isomeric cresols, xylenols and hydroxy diphenyls.

The styrenated phenol is produced according to known methods, for example, reacting 1 to 3 moles of styrene and 1 mole of phenol in the presence of catalysts such as, for example, sulfuric acid, para-toluene sulfonic acid or zinc chloride. The addition products can be alkoxylated with 1 to 30 moles of an alkyl oxide such as, for example, ethylene oxide or propylene oxide. Other alkoxylation methods can be used if desired, for example, 1,3-propane diol can be used as the alkoxylation moiety according to known methods.

One preferred styrenated alkoxylated phenol is commercially available as SYNFAC® 8834 from the Milliken Chemical Corporation, Spartanburg, S.C.

In another embodiment, the present disclosure relates to a pigment dispersant composition. As used herein, a pigment dispersant composition is a mixture consisting essentially of (a) the pigment dispersing resin and (b) water. The pigment dispersant is essentially free from volatile organic solvents.

The pigment dispersant comprises in the range of from 25 percent to 75 percent by weight of the pigment dispersing resin and in the range of from 75 percent to 25 percent by weight of water. Preferably, the pigment dispersant comprises in the range of from 35 to 70 percent by weight of the pigment dispersing resin and in the range of from 65 percent to 30 percent by weight of water. More preferably, the pigment dispersant comprises in the range of from 40 to 60 percent by weight of the pigment dispersing resin and in the range of from 60 percent to 40 percent by weight of water.

Pigment dispersant can be obtained, for example, by reacting bisphenol A epoxy resin, with N,N-diethanol amine to endcap the bisphenol A epoxy resin in a (1:2) molar ratio. The reaction can be carried out in the presence of the alkoxylated styrenated phenol, and the product mixed with an aqueous solution of a carboxylic acid to neutralize the amine groups. Preferably, the carboxylic acid is lactic acid. Optionally, water can be added to obtain the desired concentration pigment dispersant.

In still another embodiment, the present disclosure relates to a pigment dispersion, alternatively referred to in the art as a "pigment paste", which is a mixture comprising a pigment dispersant and dispersed pigment.

To disperse pigments in the pigment dispersant, a mixture of the pigment dispersant and the desired pigments are placed in a suitable mixing device, preferably a mill, along with any optional additives, such as, for example, wetting agents, surfactants, organic metal catalysts, defoamers or a combination thereof. The mixture is ground to form a pigment paste. Suitable mixing devices include, for example, horizontal mills, roller mills, ball or pebble mills, sand mills, or attritors. Horizontal mills, such as the kind manufactured by Eiger Machinery, Inc., Bensenville, Ill., are very efficient for producing pigment pastes. After grinding, the particle size of the pigment should be as small as practical, generally, 6 to 8, when measured using a Hegman grinding gauge.

The ratio of pigments to pigment dispersant can vary in the range of from 1:50 to about 10:1. Preferably, the ratio of pigments to pigment dispersant can vary in the range of from 1:10 to about 8:1 and more preferably, the ratio of pigments to pigment dispersant can vary in the range of from 1:5 to about 5:1.

Pigments that can be used in the practice of the present disclosure are well known. Suitable pigments include, for example, titanium dioxide, basic lead silicate, basic lead sulfate, aluminum silicate, carbon black, strontium chromate, barium carbonate, calcium carbonate, magnesium carbonate, barium sulfate, calcium sulfate, magnesium sulfate, dibutyl tin oxide, bismuth trioxide, bismuth oxide, bismuth hydroxide, bismuth lactate, or other bismuth salts, silicas, clays, kaolin, talc, mica, silicon oxides, titanium oxides, zirconium oxides, zinc oxides, magnesium oxides, aluminum oxides, iron oxides or combinations thereof.

It has been found that a cathodic electrocoating composition comprising the disclosed pigment dispersant provides a coating that is thicker at a given distance away from the electrode than a coating comprising prior art pigment dispersants. That is, an electrocoat composition comprising a pigment dispersion according to the present disclosure produces significantly better wedge than a cathodic electrocoat composition comprising conventional pigment dispersions (i.e., those utilizing volatile organic compounds). One of ordinary skill in the art would know that "wedge" is a term that describes the change in thickness of layer of an electrodeposited coating as a function of its distance from the counter electrode. The closer the substrate is to an electrode, the thicker the layer of applied coating.

The pigment dispersant can be used in cathodic electrocoating compositions that are known to one of ordinary skill in the art. Suitable cathodic electrocoating compositions comprise an electrodepositable binder that comprises an aqueous emulsion of an epoxy amine adduct blended with a crosslinking agent which has been neutralized with an acid to form a water-soluble product. The electrodepositable binder typically is a blend of an epoxy amine adduct and a blocked polyisocyanate crosslinking agent. While the pigment dispersants are potentially usable with a variety of different cathodic electrocoat resins, the epoxy amine adduct resins are particularly preferred. These resins are generally disclosed in U.S. Pat. No. 4,419,467. Other useful examples of epoxy amine adduct resins can be found in CORMAX® or EC-3000AM® electrocoats available from Dupont, Wilmington, Del. and POWERCRON® electrocoats, available from PPG, Pittsburgh, Pa.

Preferred crosslinkers for the epoxy amine adduct resins are also well known in the art. These are aliphatic, cycloaliphatic and aromatic isocyanates such as hexamethylene diisocyanate, cyclohexamethylene diisocyanate, toluene diisocyanate, methylene diphenyl diisocyanate and the like. These isocyanates are pre-reacted with a blocking agent such as, for example, oximes, alcohols, caprolactams or a combination thereof which block the isocyanate functionality, i.e., the crosslinking functionality. Upon heating the blocking agent separates, thereby providing a reactive isocyanate group and crosslinking occurs. Isocyanate crosslinkers and blocking agents are well known in the prior art and also are disclosed in the aforementioned U.S. Pat. No. 4,419,467.

The cathodic binder of the epoxy amine adduct and the blocked isocyanate are the principal resinous ingredients in the electrocoating composition and are usually present in amounts of about 30 to 50% by weight of solids of the composition. To form an electrocoating bath, the principal resinous ingredients are generally reduced with an aqueous medium. Additives as are well known in the art can also be present, such as anti-corrosion agents, crosslinking catalysts, surfactants, defoamers, anti-crater additives or a combination thereof.

The disclosed electrocoat bath comprises in the range of from 1 percent to 15 wt % pigment dispersion by weight of the electrocoat bath. Preferably, the electrocoat bath comprises in the range of from 2 percent to 12 percent pigment dispersion, and more preferably in the range of from 3 percent to 10 percent pigment dispersion by weight of the electrocoat bath. All percentages by weight are based on the total weight of all the components in the electrocoat bath. An electrocoat composition comprising the pigment dispersion is essentially free from volatile organic solvents.

The substrate to be coated is an electrically conductive article, especially metal, such as, for example, steel, aluminum or copper. The article is placed in contact with the electrocoat bath and a current is passed through the article. While in contact with the bath, an adherent film is deposited on the article, which serves as the cathode. The conditions under which the electrodeposition takes place can vary widely. The applied voltage can typically vary in the range of from 50 volts to 500 volts. The current density can vary in the range of from 1 amperes per square meter to 150 amperes per square meter. After the coating is deposited, the coated substrate is removed from the bath, it can optionally be rinsed and then the coating is cured at elevated temperatures by any of the known means, such as, for example, in baking ovens, with banks of infra red lamps or a combination thereof.

EXAMPLES

At the time of this disclosure, all ingredients were available from the manufacturers as noted. If no manufacturer is listed, the ingredient is available from the Aldrich Chemical Company, Milwaukee, Wis.

EPON® 828 and EPON® 829 are available from Hexion Specialty Chemicals, Houston, Tex.

SYNFAC® 8334 is available from the Milliken Chemical Corporation, Spartanburg, S.C.

BUTYL CELLOSOLVE® is butoxyethanol and is available from Dow Chemical, Midland, Mich.

Aluminum Triphosphate is available from Tayca Corp. Ltd., Osaka, Japan.

| Preparation of Pigment Dispersing Resin 1 | | | | | |
|---|---|---|---|---|---|
| Ingredients | % Solids | Equivalent Wt | No. equivalents | Weight (grams) | Solids |
| Diethanol amine | 100% | 105 | 5.00 | 525.00 | 525.00 |
| EPON ® 828 | 100% | 187 | 5.00 | 935.00 | 935.00 |
| SYNFAC ® 8334 | 100% | | | 973.33 | 973.33 |
| Lactic acid | 56% | 160.7 | 5.00 | 803.50 | 449.99 |

-continued

Preparation of Pigment Dispersing Resin 1

| Ingredients | % Solids | Equivalent Wt | No. equivalents | Weight (grams) | Solids |
|---|---|---|---|---|---|
| Deionized water (D.I. Water) | 0% | 18 | | 882.20 | |

EPON® 828 with an epoxy equivalent weight of 187, diethanol amine and SYNFAC® 8334 (ethoxylated styrenated phenol) were charged to a reaction vessel and heated with nitrogen blanket to 66° C. to initiate an exothermic reaction having a peak temperature of about 120° C. The reaction mixture was held between 94° C.-120° C. until the epoxy equivalent weight approached zero. The amine equivalent was determined to be 487. The batch was transferred to a thin tank that contained pre-charged lactic acid and water for neutralization process. The batch was mixed for 20 min. The resin solution has a 70% solids and a bubble viscosity of U-V.

Preparation of Pigment Dispersing Resin 2

| Ingredients | % Solids | Equivalent wt | No. equivalents | Weight (grams) | Solids |
|---|---|---|---|---|---|
| EPON® 828 | 100% | 187.0 | 4.80 | 898.08 | 898.08 |
| Bisphenol A | 100% | 114.0 | 1.30 | 149.30 | 149.3 |
| Ethyl triphenyl Phosphonium iodide | 100% | | | 0.898 | |
| SYNFAC® 8334 | 100% | | | 1153.25 | 1153.25 |
| Diethanol amine | 100% | 105 | 3.50 | 367.50 | 367.50 |
| Lactic acid | 56% | 160.7 | 3.50 | 562.45 | 314.97 |
| D.I. Water | | 18 | | 2634.72 | |

EPON® 828 with an epoxy equivalent weight of 187, Bisphenol A and ethyl triphenyl phosphonium iodide were charged to a reaction vessel and heated with nitrogen blanket to 144° C. to initiate an exothermic reaction having a peak temperature of about 200° C. The reaction mixture was held at 180° C. until an epoxy equivalent weight of 300 was obtained. At 180° C., SYNFAC® 8334 was charged. The batch was then cooled to 100° C., and diethanol amine was added slowly drop-wise to the reactor. The batch was allowed to exotherm to 121° C., and held at 121° C. until the epoxy equivalent weight approached zero (1 hour). The amine equivalent was determined to be 734. The batch was transferred to a thin tank that contained pre-charged lactic acid and water for neutralization process. The batch was mixed for 20 min. The resin solution has a 50% solids and a bubble viscosity of U-V.

Preparation of Pigment Dispersing Resin 3

| Ingredient | % Solids | Equivalent wt | No. equivalents | Weight (grams) | Solids |
|---|---|---|---|---|---|
| EPON® 828 | 100% | 187.0 | 4.83 | 903.32 | 903.32 |
| Bisphenol A | 100% | 114.0 | 2.00 | 228.00 | 228.00 |
| Ethyl triphenyl Phosphonium iodide | 100% | | | 0.90 | |
| SYNFAC® 8334 | 100% | | | 952.17 | 952.17 |
| Diethanol amine | 100% | 105 | 2.83 | 296.94 | 296.94 |
| Lactic acid | 56% | 160.7 | 2.83 | 454.46 | 254.50 |
| D.I. Water | | 18 | | 2434.97 | |

EPON® 828 with an epoxy equivalent weight of 187, Bisphenol A and ethyl triphenyl phosphonium iodide were charged to a reaction vessel and heated with nitrogen blanket to 144° C. to initiate an exothermic reaction having a peak temperature of about 200° C. The reaction mixture was held at 180° C. until an epoxy equivalent weight of 400 was obtained. At 180° C., SYNFAC® 8334 was charged. The batch was then cooled to 100° C., and diethanol amine was added slowly drop-wise to the reactor. The batch was allowed to exotherm to 121° C., and held at 121° C. until the epoxy equivalent weight approached zero (1 hour). The amine equivalent was determined to be 842. The batch was transferred to a thin tank that contained pre-charged lactic acid and water for neutralization process. The batch was mixed for 20 min. The resin solution has a 50% solids and a bubble viscosity of Z-Z1.

Preparation of Pigment Dispersing Resin 4

| Ingredients | % Solids | Equivalent wt | No. equivalents | Weight (grams) | Solids |
|---|---|---|---|---|---|
| EPON® 828 | 100% | 187.0 | 4.80 | 898.08 | 898.08 |
| Bisphenol A | 100% | 114.0 | 2.40 | 273.60 | 273.6 |
| Ethyl triphenyl Phosphonium iodide | 100% | | | 0.898 | |
| SYNFAC® 8334 | 100% | | | 1096.16 | 1096.16 |
| Diethanol amine | 100% | 105 | 2.40 | 252.00 | 252.00 |
| Lactic acid | 56% | 160.7 | 2.40 | 385.68 | 215.98 |
| D.I. Water | | 18 | | 2570.04 | |

EPON® 828 with an epoxy equivalent weight of 187, Bisphenol A and ethyl triphenyl phosphonium iodide were charged to a reaction vessel and heated with nitrogen blanket to 144° C. to initiate an exothermic reaction having a peak temperature of about 200° C. The reaction mixture was held at 180° C. until an epoxy equivalent weight of 500 was obtained. At 180° C., SYNFAC® 8334 was charged. The batch was then cooled to 100° C., and diethanol amine was added slowly drop-wise to the reactor. The batch was allowed to exotherm to 121° C., and held at 121° C. until the epoxy equivalent weight approached zero (1 hour). The amine equivalent was determined to be 1052. The batch was transferred to a thin tank that contained pre-charged lactic acid and water for neutralization process. The batch was mixed for 20 min. The resin solution has a 50% solids and a bubble viscosity of Z6-Z7.

The effect of various epoxy equivalent weights on resin viscosity is summarized below:

| | Epoxy equiv. wt | % solids | % water | Bubble viscosity | Amine equiv. wt |
|---|---|---|---|---|---|
| Pigment Dispersing Resin 1 | 188 | 70 | 30 | U-V | 487 |
| Pigment Dispersing Resin 2 | 300 | 50 | 50 | U-V | 734 |
| Pigment Dispersing Resin 3 | 400 | 50 | 50 | Z-Z1 | 842 |
| Pigment Dispersing Resin 4 | 500 | 50 | 50 | Z6+ | 1052 |

Preparation of Pigment Dispersing Resin 5 (comparative)

| Ingredients | % Solids | Equiv. weight | No. equiv. wt | Weight (grams) | Solids |
|---|---|---|---|---|---|
| EPON ® 828 | 100% | 187.0 | 4.77 | 891.80 | 891.80 |
| Ethyl triphenyl Phosphonium iodide | 100% | | | 0.89 | |
| Bisphenol A | 100% | 114.0 | 3.25 | 370.96 | 370.96 |
| ½ capped TDI[1] | 93% | 317.0 | 1.55 | 529.36 | 492.30 |
| BUTYL CELLOSOLVE ® | | | | 1447.69 | |
| Ter. Amine salt[2] | 75% | 499.2 | 1.10 | 732.63 | 549.47 |
| | | | | 3973.33 | 2304.53 |

[1]2-Ethyl hexanol half-capped toluene diisocyanate in methyl isobutyl ketone.
[2]The tertiary amine salt was prepared in accordance with Example 1 of U.S. Pat. No. 4,081,343.

EPON®828 with an epoxy equivalent weight of 187, Bisphenol A and ethyl triphenyl phosphonium iodide were charged to a reaction vessels and heated with nitrogen blanket to 144° C. to initiate an exothermic reaction having a peak temperature of about 200° C. The reaction mixture was held at 180° C. until an epoxy equivalent weight of 835 was obtained. After cooling the batch to 132° C., ½ capped TDI (toluene diisocyanate) was charged to the reactor. The batch was held at 124° C. until zero NCO value was achieved. Once zero NCO was achieved, butylcellosolve and tertiary amine salt were charged to the reactor. The reaction mixture was maintained at 90° C. until an acid value less than 1 was obtained (6 hours). The resin solution has 58% solids, 39% BUTYL CELLOSOLVE®, 3% water and had a bubble viscosity of Z2-Z4.

Preparation of Dibutyl Tin Oxide Intermediate Paste

An intermediate dibutyltin oxide pigment paste employing Pigment Dispersing Resin 5 was prepared from the following ingredients:

| Ingredient | Weight (grams) | Solids |
|---|---|---|
| Pigment Dispersing Resin 5 | 21.83 | 12.66 |
| Deionized water | 15.35 | |
| Dibutyltin oxide | 31.65 | 31.65 |
| Deionized water | 31.17 | |
| | 100.00 | 44.31 |

The above ingredients were ground in the Eiger mill using Zirconia media to a Hegman No. 6 to 6.5. The resulting pastes had a solids content of 44.3%, 8.5% BUTYL CELLOSOLVE®, and 47.2% deionized water. The pigment to binder ratio of this paste is 2.5 to 1.

Preparation of Pigment Dispersion Pastes 1 to 4

| Ingredient | Pigment Paste 1 | Pigment Paste 2 | Pigment Paste 3 | Pigment Paste 4 |
|---|---|---|---|---|
| | (grams) | | | |
| Pigment Dispersing Resin 1 | 13.97 | | | |
| Pigment Dispersing Resin 2 | | 19.55 | | |
| Pigment Dispersing Resin 3 | | | 19.55 | |
| Pigment Dispersing Resin 4 | | | | 19.55 |
| D.I. Water | 35.58 | 30 | 30 | 30 |
| Acetic acid (25%) | 1.44 | 1.44 | 1.44 | 1.44 |
| Dibutyltin oxide paste (44%) | 15.71 | 15.71 | 15.71 | 15.71 |
| Titanium dioxide | 12.59 | 12.59 | 12.59 | 12.59 |
| Barium sulfate | 14.67 | 14.67 | 14.67 | 14.67 |
| Carbon black | 0.36 | 0.36 | 0.36 | 0.36 |
| Aluminum silicate | 3.28 | 3.28 | 3.28 | 3.28 |
| Aluminum triphosphate | 2.4 | 2.4 | 2.4 | 2.4 |
| | 100 | 100 | 100 | 100 |

The above ingredients were ground in the Eiger mill using Zirconia media to a Hegman No. 7 to 7.5. Each of the resulting pastes had a solids content of 50% and a pigment to binder ratio of 3.25/1.

The effect of the above pigment pastes on pigment dispersability, heat stability and shelf stability were evaluated, and summarized below:

| | % Solids | Pigment Dispersability | Heat (60° C.) Stability | Shelf Stability |
|---|---|---|---|---|
| Pigment Paste 1 | 50 | Poor | Poor | Poor |
| Pigment Paste 2 | 50 | Poor | Poor | Poor |
| Pigment Paste 3 | 50 | OK | 51.6° C. | Acceptable |
| Pigment Paste 4 | 50 | OK | 51.6° C. | Marginal |

As shown in this screening study above, pigment paste 3 made with the pigment dispersing resin 3 was the preferred pigment paste formulation.

Preparation of Pigment Paste 5 (comparative)

| Ingredient | Weight (grams) | Resin solids |
|---|---|---|
| Pigment dispersing resin 5 | 16.86 | 9.78 |
| D.I. Water | 32.70 | |
| Acetic acid (25%) | 1.44 | |
| Dibutyltin oxide paste (44%) | 15.71 | 6.92 |
| Titanium dioxide | 12.59 | 12.59 |
| Barium sulfate | 14.67 | 14.67 |
| Carbon black | 0.36 | 0.36 |
| Aluminum silicate | 3.28 | 3.28 |
| Aluminum triphosphate | 2.40 | 2.40 |
| | 100.00 | 50.00 |

The above ingredients were ground in the Eiger mill using Zirconia media to a Hegman No. 7 to 7.5. The resulting paste had a solids content of 50% and a pigment to binder ratio of 3.25/1.

Preparation of Cathodic Electrocoat Resin 1
A cationic depositable resin was prepared in accordance with
U.S. Pat. No. 4,419,467.

| Ingredients | Parts by weight |
|---|---|
| EPON ® 829 | 114 |
| Bisphenol A-ethylene oxide adduct (1/7 molar ratio) | 38 |
| Xylene | 5.4 |
| Bisphenol A | 31 |
| N,N-dimethyl benzylamine | 0.6 |
| Crosslinker[1] | 139.6 |
| Diketimine[2] | 11.9 |
| N-methyl ethanolamine | 9.3 |
| 1-phenoxy-2-propanol | 14.7 |
| acetic acid | 5.2 |
| Surfactant | 7.2 |
| D.I. Water | 408 |

[1]2-Ethyl hexanol half-capped toluene diisocyanate in methyl isobutyl ketone. The crosslinker is present as a 70 percent solids solution in methyl isobutyl ketone and butanol (9:1 weight ratio).
[2]Diketimine is derived from diethylene triamine and methyl isobutyl ketone (73 percent solids in methyl isobutyl ketone).

EPON® 829, Bisphenol A-ethylene oxide adduct (1/7 molar ratio), and xylene were charged to a reaction vessel and heated under nitrogen sparge to 210° C. The reaction was held at 200° C.-215° C. with refluxing to remove any water present. The ingredients were then cooled to 150° C. and the bisphenol A and N,N-dimethyl benzylamine (0.26 parts) was added. The reaction mixture was heated to 150° C. and held between 150° C. and 190° C. for 30 minutes and then cooled to 130° C. The remaining portion of the N,N-dimethyl benzylamine was added and the reaction as held at 130° C. for about 2½ hours until a reduced Gardner-Holdt viscosity of K was obtained. Crosslinker 1, diketimine 1 and N-methyl ethanolamine were then added and the temperature of the reaction was brought to 110° C. and held at this temperature for 1 hour. 1-phenoxy-2-propanol was added. The reaction mixture was then dispersed in a mixture of acetic acid, surfactant, and deionized water. The organic solvent was then removed by vacuum distillation.

Electrodeposition Paint example 1
Preparation of cationic electrodeposition paint using pigment paste 3

| Component | Weight (grams) | Solids (grams) |
|---|---|---|
| Cathodic Electrocoat Resin 1 | 1705.2 | 648.0 |
| D.I. Water | 1990.8 | |
| Pigment paste 3 | 304.0 | 152.0 |
| | 4000.0 | 800.0 |

Deionized water was added to cathodic electrocoat resin 1 followed by the addition of pigment paste 3. The electrodeposition paint was formulated at 20% solids and pigment to binder ratio of 0.17/1.0. The resulting bath had a pH of 5.9-6.2.

Zinc phosphated steel panels were electrocoated in this bath at different voltages for 135 seconds, and at electrocoat bath temperature of 32° C. The wet films were baked at 180° C. (metal temperature) for 10 minutes to produce dry, smooth film having a films thickness ranging from 15 to 35 microns. The cured film withstood 200 methyl ethyl ketone (MEK) double rubs.

Electrodeposition Paint example 2 (comparative)

| Component | Weight (grams) | Solids (grams) |
|---|---|---|
| Cathodic Electrocoat Resin 1 | 1705.2 | 648.0 |
| D.I. Water | 1990.8 | |
| Pigment Paste 5 | 304.0 | 152.0 |
| | 4000.0 | 800.0 |

Deionized water was added to cathodic electrocoat resin 1 followed by the addition of pigment paste 5. The electrodeposition paint was formulated at 20% solids and pigment to binder ratio of 0.17/1.0. The resulting bath had a pH of 5.9-6.2.

Zinc phosphated steel panels were electrocoated in this bath at different voltages for 135 seconds, and at electrocoat bath temperature of 32° C. The wet films were baked at 180° C. (metal temperature) for 10 minutes to produce dry, smooth films having a film thickness ranging from 15 to 35 microns. The cured film withstood 200 methyl ethyl ketone (MEK) double rubs.

Electrocoat Bath Properties

The table below compares bath properties of Electrodeposition Paint example 1 and the comparative Electrodeposition Paint example 2. As shown in the table, the inventive Electrodeposition Paint example 1 gave excellent wedge when compared to the Electrodeposition Paint example 2. An important feature of the electrodeposition process in automotive application is its ability to extend film thickness into recessed area such as, for example, a complex car body. This process is called throwing power. A system that has the ability to coat highly recessed area is said to have high throwing power.

| Properties | Electrodeposition Paint example 1 | Electrodeposition Paint example 2 (comparative) |
|---|---|---|
| pH @ 25° C. | 5.98 | 6.09 |
| Conductivity @ 25° C. (µS/cm) | 2170 | 2060 |
| VOC (lbs/gal) (@ 6.5 gal. resin emulsion to 1 gal. paste) | 0.18[1] | 0.45 |
| Coating voltage at 32° C. bath temperature | 230 V | 225 V |
| Film build (microns) | 21 | 21 |
| Appearance | Acceptable | Acceptable |
| Throw power @ 32° C. bath temp. (mm) | 216 | 215 |
| Wedge @ 12.5 microns film build (mm) | 70 | 48 |

[1]The VOC in this formulation comes from the DBTO paste. It would be possible to use a low or no VOC DBTO paste and achieve the same or similar results with little or no VOC.

Throw power and wedge were determined according to the procedures of Ford of Europe Laboratory Test Method—MJ BI 20-2C Electrocoat Corrosion Performance Long-term corrosion performance (20 cycle scab & 40 cycle accelerated was tested. The corrosion performance was tested at 165° C., 180° C. and 200° C. by 10-minute metal temperature. The table below compares the Electrodeposition Paint example 1 with Electrodeposition Paint example 2. To compare the performance, we averaged the creepage data over the three bake temperatures. From the results (below), the performance of the test grind resin was found to be equal to the control.

| Properties | Electrodeposition Paint example 1 | Electrodeposition Paint example 2 |
|---|---|---|
| 20 cycle scab corrosion (mm) | 1.4 | 1.3 |
| 40 cycle accelerated corrosion (mm) | 2.5 | 2.6 |

Corrosion tests were performed according to General Motors test methods GM9511P, 20 cycle scab, and GM9540P, 40 cycle accelerated.

What is claimed is:

1. A pigment dispersant consisting essentially of
A) an aminated epoxy resin of formula (I)

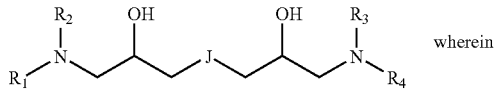

wherein

J is the residue of a bisphenol epoxy resin and each of $R_1$, $R_2$, $R_3$ and $R_4$ are independently selected from the group consisting of H, C1 to C4 alkyl, C1 to C6 hydroxy alkyl, carbocycle or heterocycle containing moiety and optionally, $R_1$ and $R_2$ or $R_3$ and $R_4$ can be taken together to form a cyclic structure and wherein the amine groups are 80 percent to 100 percent neutralized with a carboxylic acid;

B) an alkoxylated styrenated phenol; and

C) water wherein the pigment dispersant is essentially free from volatile organic solvents.

2. The pigment dispersant of claim 1 wherein the alkoxylated styrenated phenol is a compound according to formula (III)

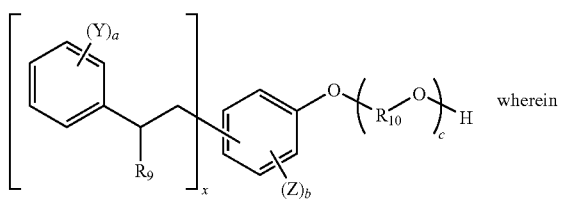

Y is C1 to C4 alkyl; $R_9$ is H or $CH_3$; Z is C1 to C4 alkyl or an aromatic group; $R_{10}$ is C1 to C4 alkyl; x denotes an average of 1 to 3; a is 0 to 2; b is 0 to 2 and c is 2 to 30.

3. A pigment dispersing resin consisting essentially of
A) an aminated epoxy resin of formula (I)

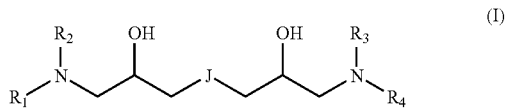

wherein J is the residue of a bisphenol epoxy resin and each of $R_1$, $R_2$, $R_3$ and $R_4$ are independently selected from the group consisting of H, C1 to C4 alkyl, C1 to C6 hydroxy alkyl, carbocycle or heterocycle containing moiety and optionally, $R_1$ and $R_2$ or $R_3$ and $R_4$ can be taken together to form a cyclic structure and wherein the amine groups are 80 percent to 100 percent neutralized with a carboxylic acid;

B) an alkoxylated styrenated phenol; and wherein the pigment dispersing resin is essentially free from volatile organic solvents.

4. The pigment dispersing resin of claim 3 wherein the alkoxylated styrenated phenol is a compound according to formula (III)

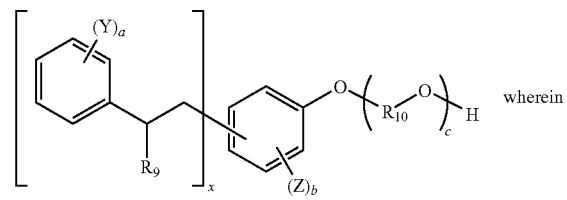

Y is C1 to C4 alkyl; $R_9$ is H or $CH_3$; Z is C1 to C4 alkyl or an aromatic group; $R_{10}$ is C1 to C4 alkyl; x denotes an average of 1 to 3; a is 0 to 2; b is 0 to 2 and c is 2 to 30.

5. A cathodic electrocoating composition comprising an electrodepositable binder composition, a pigment dispersant and pigment; wherein the pigment dispersant consists essentially of
A) an aminated epoxy resin of formula (I)

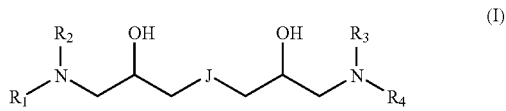

wherein J is the residue of a bisphenol epoxy resin and each of $R_1$, $R_2$, $R_3$ and $R_4$ are independently selected from the group consisting of H, C1 to C4 alkyl, C1 to C6 hydroxy alkyl, carbocycle or heterocycle containing moiety and optionally, $R_1$ and $R_2$ or $R_3$ and $R_4$ can be taken together to form a cyclic structure and wherein the amine groups are 80 percent to 100 percent neutralized with a carboxylic acid;

B) an alkoxylated styrenated phenol; and

C) water;

wherein the pigment dispersant is essentially free from volatile organic solvents.

6. The cathodic electrocoating composition of claim 5 comprising 1 to 15 percent by weight based on the weight of the electrodepositable binder composition of the pigment dispersant.

7. The cathodic electrocoating composition of claim 5 wherein the alkoxylated styrenated phenol is a compound according to formula (III);

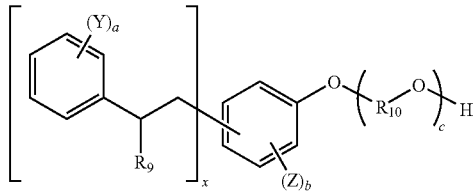

(III)

wherein Y is C1 to C4 alkyl; $R_9$ is H or $CH_3$; Z is C1 to C4 alkyl or an aromatic group; $R_{10}$ is C1 to C4 alkyl; x denotes an average of 1 to 3; a is 0 to 2; b is 0 to 2 and c is 2 to 30.

8. The cathodic electrocoating composition of claim 5 wherein each of $R_1$, $R_2$, $R_3$ and $R_4$ is —$CH_2CH_2OH$.

9. The cathodic electrocoating composition of claim 5 wherein said bisphenol epoxy resin has an epoxy equivalent weight prior to being aminated of greater than 300 to less than 500.

10. The cathodic electrocoating composition of claim 5 wherein the carboxylic acid is lactic acid.

11. The cathodic electrocoat composition of claim 5 wherein the ratio of pigment to pigment dispersant is greater than or equal to 5 to 1.

12. A method for forming a coating on a substrate comprising depositing an electrodepositable coating composition on a conductive substrate wherein the electrodepositable coating composition comprises a pigment dispersant and pigment and said pigment dispersant consists essentially of A) an aminated epoxy resin of formula (I)

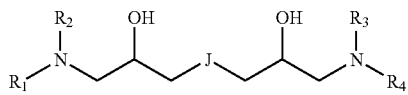

(I)

wherein J is the residue of a bisphenol epoxy resin and each of $R_1$, $R_2$, $R_3$ and $R_4$ are independently selected from the group consisting of H, C1 to C4 alkyl, C1 to C6 hydroxy alkyl and wherein the amine groups are 80 percent to 100 percent neutralized with a carboxylic acid;

B) an alkoxylated styrenated phenol; and wherein the pigment dispersant is essentially free from volatile organic solvents; and curing said deposited electrodepositable coating composition.

13. The method of claim 12 wherein the pigment dispersant of claim 1 wherein said bisphenol epoxy resin has an epoxy equivalent weight prior to being aminated of greater than 300 to less than 500.

14. The method of claim 12 wherein the pigment dispersant of claim 1 wherein the carboxylic acid is lactic acid.

15. The method of claim 12 wherein the pigment dispersant of claim 1 wherein each of $R_1$, $R_2$, $R_3$ and $R_4$ is —$CH_2CH_2OH$.

16. The method of claim 12 wherein the ratio of pigment to pigment dispersant is greater than or equal to 5 to 1.

17. The method of claim 12 wherein the alkoxylated styrenated phenol is a compound according to formula (III);

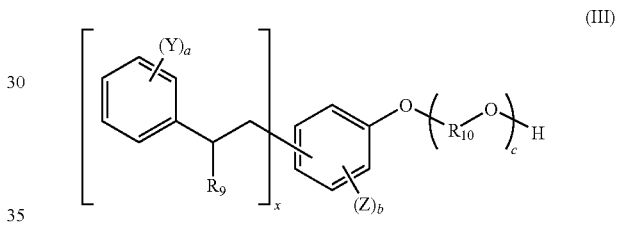

(III)

wherein Y is C1 to C4 alkyl; $R_9$ is H or $CH_3$; Z is C1 to C4 alkyl or an aromatic group; $R_{10}$ is C1 to C4 alkyl; x denotes an average of 1 to 3; a is 0 to 2; b is 0 to 2 and c is 2 to 30.

\* \* \* \* \*